(12) United States Patent
Vincent (10) Patent No.: US 8,706,836 B2
(45) Date of Patent: Apr. 22, 2014

(54) LIVE STREAMING MEDIA AND DATA COMMUNICATION HUB

(76) Inventor: Shara Susznnah Vincent, Hillsboro Beach, FL (US)

( * ) Notice: Subject to any disclaimer, the term of this patent is extended or adjusted under 35 U.S.C. 154(b) by 674 days.

(21) Appl. No.: 12/636,464

(22) Filed: Dec. 11, 2009

(65) Prior Publication Data

US 2010/0153949 A1   Jun. 17, 2010

Related U.S. Application Data

(60) Provisional application No. 61/201,809, filed on Dec. 15, 2008.

(51) Int. Cl.
*G06F 15/16* (2006.01)

(52) U.S. Cl.
USPC .......................................................... 709/217

(58) Field of Classification Search
USPC ................................. 709/217–219, 227–229
See application file for complete search history.

(56) References Cited

U.S. PATENT DOCUMENTS

| | | | |
|---|---|---|---|
| 6,181,697 B1 * | 1/2001 | Nurenberg et al. ........... 370/390 |
| 6,961,833 B2 * | 11/2005 | Leung ........................... 711/163 |
| 7,155,465 B2 * | 12/2006 | Lee et al. ............................... 1/1 |
| 7,849,462 B2 * | 12/2010 | Traut et al. ......................... 718/1 |
| 7,881,702 B2 * | 2/2011 | Heyworth et al. .......... 455/414.1 |
| 7,917,946 B2 * | 3/2011 | Lindholm et al. ............... 726/14 |
| 2002/0026571 A1 * | 2/2002 | Rickey ............................. 713/2 |
| 2002/0064189 A1 * | 5/2002 | Coupe et al. ................... 370/537 |
| 2002/0156937 A1 * | 10/2002 | Wong et al. .................... 709/328 |
| 2002/0163964 A1 * | 11/2002 | Nichols ..................... 375/240.03 |
| 2003/0053798 A1 * | 3/2003 | Roshanski et al. ............ 386/111 |
| 2004/0205550 A1 * | 10/2004 | Gerken .......................... 715/513 |
| 2007/0260702 A1 * | 11/2007 | Richardson et al. .......... 709/217 |
| 2009/0037682 A1 * | 2/2009 | Armstrong et al. ........... 711/164 |
| 2009/0210808 A1 * | 8/2009 | West .............................. 715/764 |

\* cited by examiner

*Primary Examiner* — Alicia Baturay
(74) *Attorney, Agent, or Firm* — Oakwood Law Group, LLP; Jie Tan (57) ABSTRACT

A method for delivering multimedia services by providing a virtual machine having preconfigured components unique for a client and saving software image of the virtual machine under a special code that serves as a tag that uniquely identifies a networking site of the client. A local partition on the client's physical machine such as a laptop is isolated and the isolate local partition is virtualized to one or many virtual machines to allow the transport of media to a web server of choice that has the capability of streaming back to the interface constantly and instantly for full round trip interactions. The isolated partition of a user can become a live T.V. or radio station via a virtual channel.

11 Claims, 4 Drawing Sheets

LIVE STREAMING MEDIA AND DATA COMMUNICATION HUB

REFERENCE TO RELATED APPLICATIONS

This patent application claims the benefit of U.S. Provisional Application No. 61/201,809 filed on Dec. 15, 2008, the disclosure of which is incorporated herein in its entirety by reference.

BACKGROUND OF THE INVENTION

1. Field of the Invention

The present invention relates to a method for the automation of remote data services, network services, data communications, data storage, and data storage retrieval to promote a new global distributed virtual media and data communication services hub for enhanced remote communication, business intelligence, and energy efficiency.

2. Description of Related Art

The current market is weak in all facets of global sports entertainment, including a platform conductive to social networking. Devices such as personal video recorders, DVD recorders with hard drive storage, webcams, digital cameras, online gaming consoles, and dedicated music servers will simultaneously drive growth of additional and new online multimedia connectivity solutions. Online multimedia hubs, especially in the sports entertainment industry will be key web interfaces to the digital content and services now entering mainstream households. Service providers, consumer electronics companies, and PC and peripheral manufacturer are responding to heightened consumer awareness and demand by deploying a wide variety of platforms to store, aggregate, and network content within the residential environment. "Social media can be an extremely profitable market for advertisers and media companies," according to a digital media analyst and expert in the field. The major problem with the aggregation of social medium is the lack of a platform that not only allows households to manage their entertainment and media content digitally, but very few platforms if any exist that simultaneously parse, aggregate, and transport the right content to the right preferred online social media provider without the need for large data centers and large controlling servers Right how, the storage capacity of most large data centers is reaching capacity as well as threatening our precious global energy supply and resources.

At the same time, online social networking and the demand for its corresponding media data services is currently growing at a phenomenal rate across all user domains and sectors, including corporate business sectors, entertainment sectors, and global personal computing user sectors. Industry predictions are that by 2011, online social networking will come to be regarded as just the latest expression of a long standing pattern of human behaviors that involves an increasing range of communications protocols and technologies. Due to those human behavioral patterns, the demand for improved information sharing platforms along with improved business functions will also rapidly increase. For example, in the automotive industry, Ford Motor Company recently launched a social networking structure for driving solid growth through collaboration technologies that will bring together disparate employees in multiple locations and foster collaboration and shared work practices. Also, since employees are accustomed to using such technologies and innovations in their personal lives, they have been keen to expand this experience to the workplace making the Ford initiative completely successful according to the automobile industry. Further, industry analysts have said that social interaction will become the way most business value is delivered in the modern work environment and they predict that by 2012, the primary role of business networks will be to support social interactions, not routine business transactions. The use of social networks over the internet has exponentially increased other social transformations across business structures as well.

For example, companies now need to communicate with its customers and employees in real time, which is forcing businesses to adopt and/or improve it's computerize business processes. A major problem with the advent of the new social media platforms and its rapid upward spiral demand in the business markets are the lack of a solid technical architecture and social media platforms that allows business social interactions to fully realize the business value. Additionally, another major problem which is common across all companies and industries is a lack of physical space within their respective data centers to accommodate the massive amounts of business data being generated. A recent study by the Enterprise Strategy Group conclude that in 2003, the world's computer users created and stored only 5 exabytes or 5 million terabytes of new data as compared to a new prediction that governments and business corporations will store over 25 exabytes of new data by the year 2010. Additionally, IDC research analysts' estimates that the total data storage will increase by fifty percent per year for the next five years. Moreover, every company is now using more power than ever as their computing processes continue to expand. In the past, a common business solution to this problem was a continual addition of new servers to an existing data center. However, the cost of computing power and the fact that electrical power is no longer endlessly available has now negated the addition of new servers as a viable solution.

There have been some recent developments capitalizing on the spurred growth of online social entertainment and media content external to the "sports and entertainment:" industry. Cisco Systems has deployed their own web hosting social networking internet solution "Cisco Eos", a platform for hosting as well as the creation of social networking sites. Their proprietary software administrative tools allow online business communities to set up, deploy, and manage multiple community sites. In essence, their software technology platform allows companies to build active website communities around their current branded media content.

Other recent developments include Microsoft Corp., of Redmond Wash., that is using their Windows Media Management solution for tracking the use of streaming media and files accessed or distributed from an ISP's web site.

There have been recent developments in application virtualization appliances for cache based systems management architecture with virtual appliances, network repositories, and virtual appliance transceivers by various business entities. Additionally, there have been various platforms deployed over the past several years for streaming video content over the internet.

These developments are in isolation of the total proprietary software architecture that encapsulates the total turnkey solution for a "Live Streaming Media and Data Communication Hub" virtual container and virtual appliance. Likewise, none of these more recent developments include a full turnkey set of virtual platform tools, business methods and processes that comprise the entire round trip solution for social media brokering, aggregation, and storage at the client user level that allows a client user to create, store, and manage his/her own content, repurpose that content for simultaneous aggregation and transport (of their own social content) to various preferred social media sites.

SUMMARY OF THE INVENTION

In an exemplary embodiment of the present invention, there is disclosed a method for delivering multimedia services comprises:
  providing a virtual machine containing preconfigured components unique for a client;
  saving software image of the virtual machine under a special code that serves as a tag that uniquely identifies a networking site of the client;
  providing an isolated local partition on the clients physical machine; and
  virtualizing the isolate local partition to one or many virtual machines to allow the transport of media to a web server of choice and that has the capability of streaming back to the interface constantly and instantly for full round trip interactions.

In another exemplary embodiment of the present invention, there is disclosed a system for delivering multimedia services including a live channel for live streaming comprising:
  a virtual machine on a virtual hard drive containing preconfigured components unique for a client;
  attaching a tag in the form of a special code that uniquely identifies a networking site of the client for saving software image of the virtual machine; and
  providing a hard drive having at least one isolated local partition on the clients physical machine;
  wherein the isolate local partition is virtualized to one or many virtual machines to allow the transport of media to a web server of choice and that has the capability of streaming back to the interface constantly and instantly for full round trip interactions.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIGS. 1, 2 and 3, when placed one below the other where

DESCRIPTION OF THE PREFERRED EMBODIMENT

Figure 1:
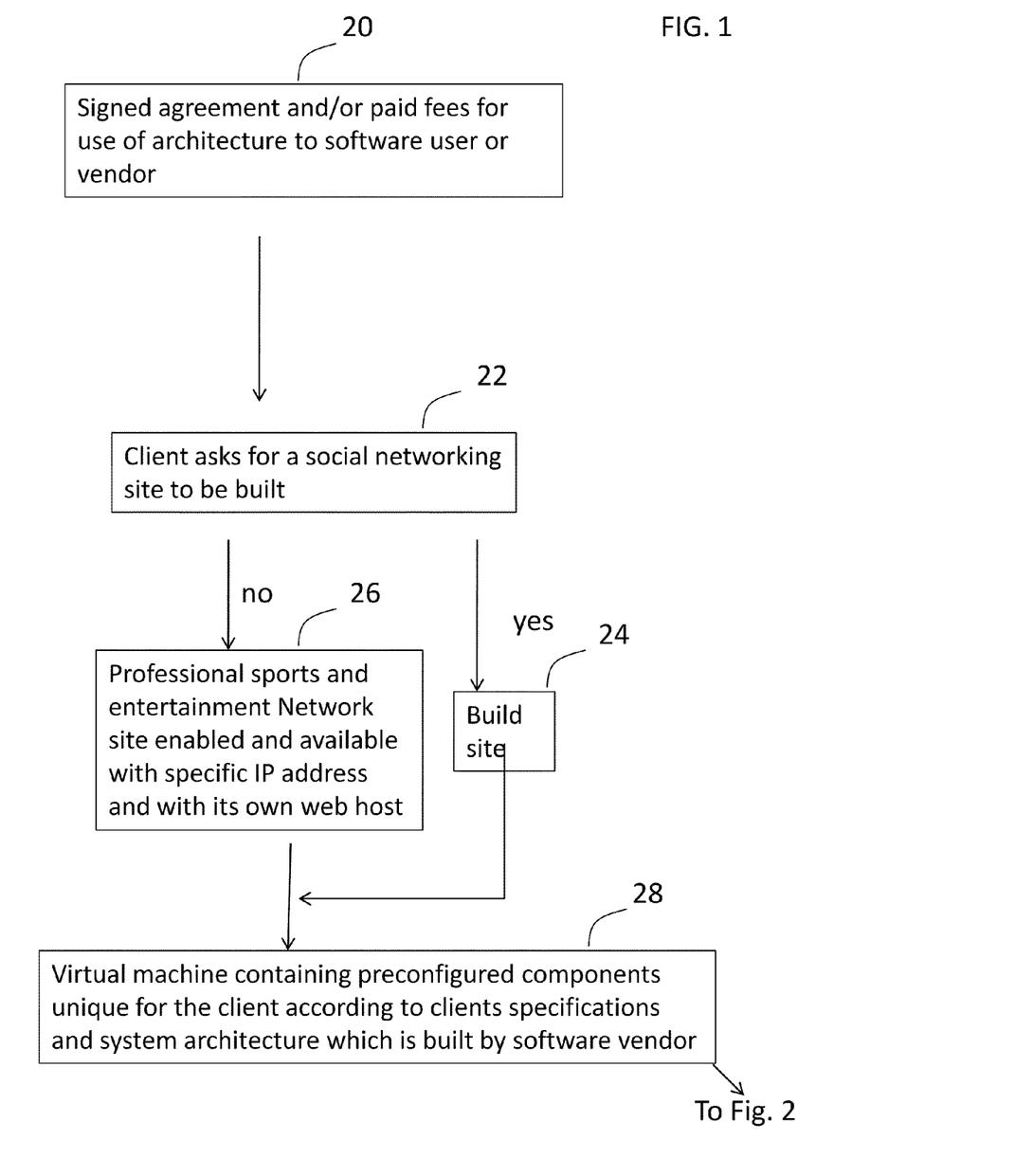
FIG. 1 is at the top, is a flow diagram of a method that enables virtual global software emulation services across multiple platform and network communication channels, rapid data retrieval from distributed global data residing on national, international, private and commercial computers, while delivering sophisticated and simultaneous live progressive streamed and social content media services without the need for an enormous mega data center in accordance with the principles of the invention.
Figure 2:
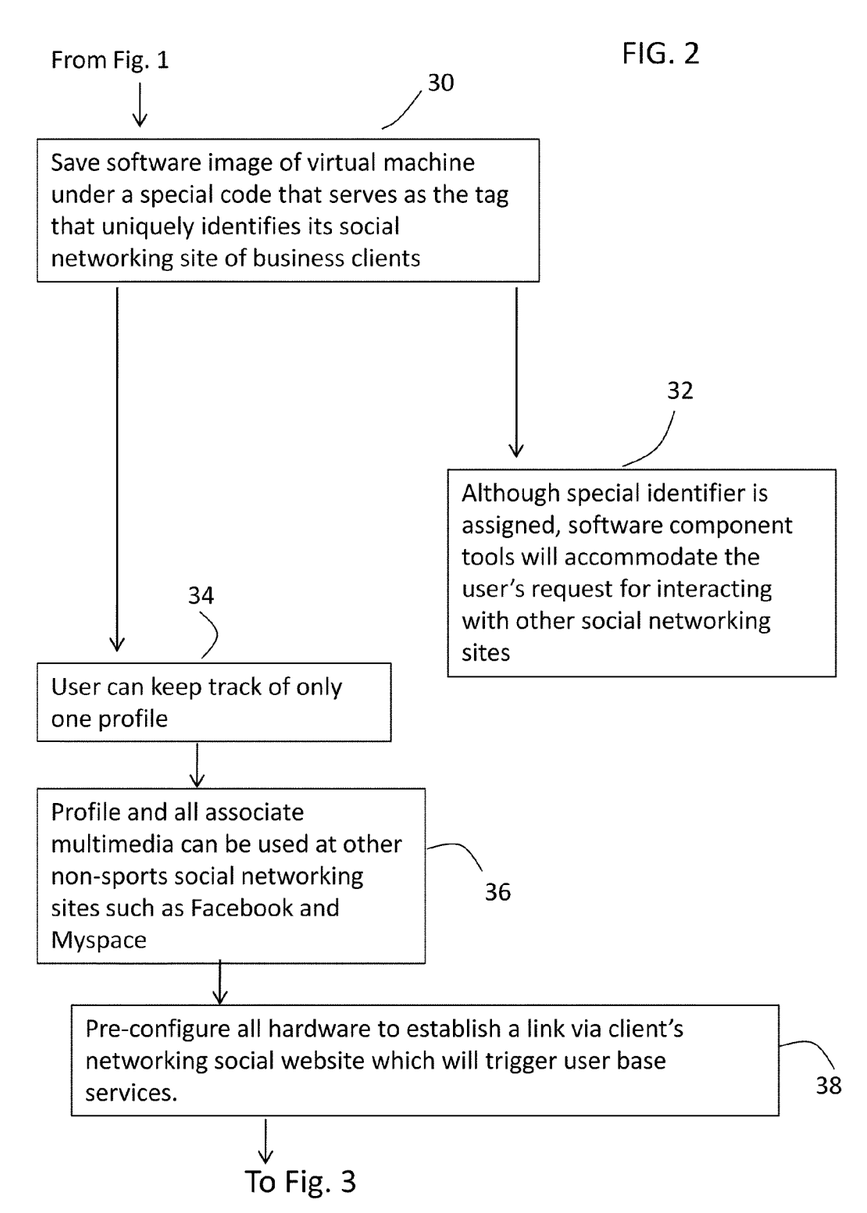
Figure 3:
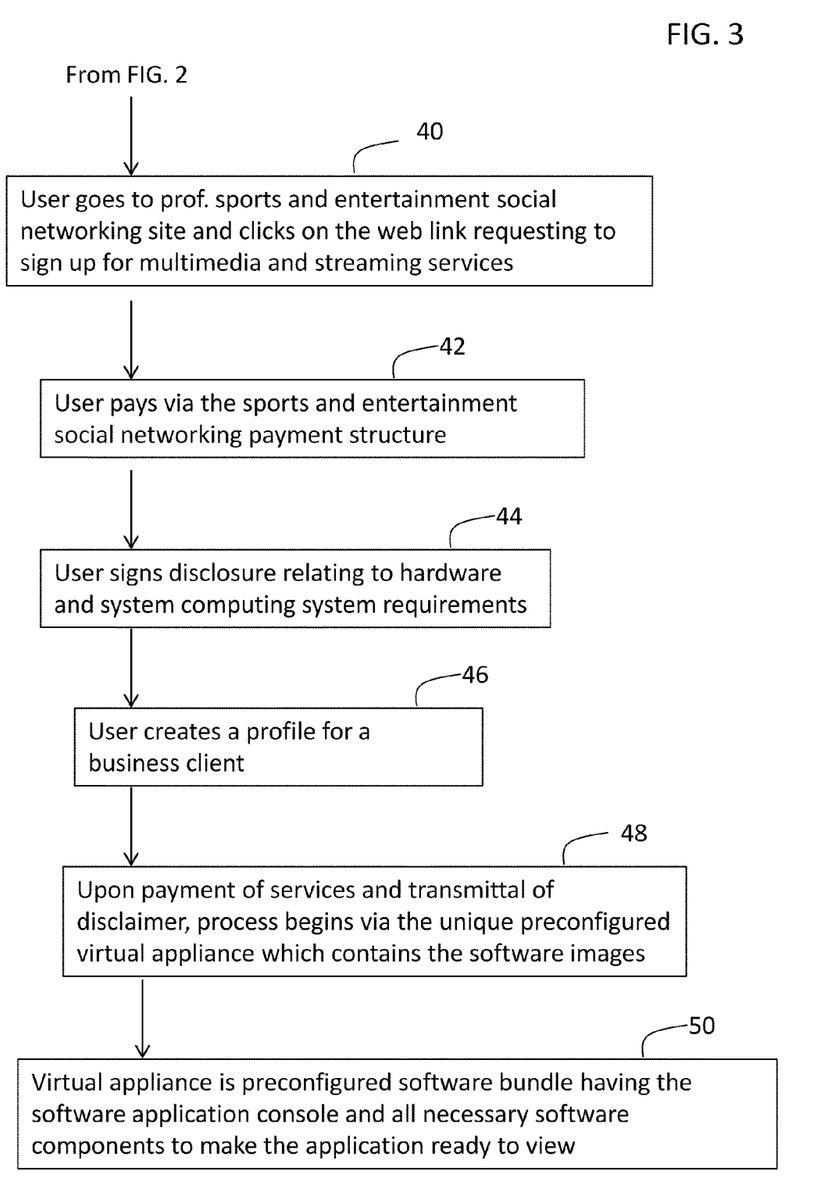

Referring to FIGS. 1, 2 and 3, there is disclosed a flow diagram of a method for the automation of global remote data services, network services, data communications, data storage, and data storage retrieval to promote a new distributed virtual media and data communication services hub for enhanced remote communication, business intelligence, and energy efficiency. The method enables global software emulation services across multiple platforms and network communication channels, rapid data retrieval from distributed global data residing on national, international, private and commercial computers, while delivering live progressive streamed services without the need for a large data center.

While promoting remote entertainment and live services at a substantially reduced cost to both the initiators and the providers of the services, the method disclosed is ideally suited for all preceding multimedia sports and entertainment applications due to its flexible live steaming media components within the client architecture, as well as other multimedia applications wherein flexibility, economy, and economies of scale is desired.

The term "live streaming" means delivery of video as an uninterrupted stream of data. Live streaming and multimedia hub embodies an architecture and encapsulates business methods that creates a unique collaboration and multiple communication channels that interacts with internal hardware, other external hardware devices, and external web servers that allows the user to create and manage multimedia, collaborate in live time with other global users, and subscribe to a live channel, thus creating a live on demand user channel that is a conceptual equivalent to a personal live radio and T.V. entity station. These progressive live and non-buffered streaming and computing will allow business events, including all levels of sports recruiting to be more efficient as well as a new mechanism of entertainment for fans as well as all other business roles.

Referring to FIGS. 1-3, the process begins with the precondition that a professional sports and entertainment social networking site signs an agreement and/or pays the necessary fees, block 20. If requested by a business client that a site be built, block 22, a social networking site will be built, block 24. However, the program is designed around the fact that a professional sports and entertainment networking site has already been enabled and is available online with a specific IP address and with its own web host, block 26. Another precondition is that the software vendor will build a virtual machine containing the preconfigured components that are unique for the client in accordance to their specification and systems architecture, block 28, and will then save that software image of the virtual machine under a special code that is unique and will serve as the tag that will uniquely identify its social networking site business clients, block 30. As part of the business technology process, the related software components will allow a user to convert his/her own physical multimedia images to the web via his/her wireless of LAN based network, removing the need for many multimedia physical servers. This is accomplished by taking a local partition on a physical machine of the client, and then virtualizing it to one or many virtual machines that will allow the transport of images and other social media interaction to a web server of choice that has the capability of streaming back to the interface constantly and instantly for full round trip interactions. Thus, a user's machine will in essence become a physical server that eventually will be converted to a unique virtual machine; that will store, create, and transfer the multimedia as software images to other social networking sites and/or other server entities. Since the isolated partition is hidden (hidden meaning a hard drive letter will not be assigned making it invisible to all operating system types) making the multimedia and its social media structure completely safe and secure from hackers.

Although a special identifier will be assigned, the software component tools will accommodate the users request for interacting with other social networking sites, block 32. This unique, block 34, where the profile and all associated multimedia can be used at other non-sports social networking sites, such as face book and my space, block 36. This eliminates the redundancy of keeping track of multiple social networking profiles.

Once everything has been preconfigured and is ready to go from a pure technology standpoint, a link will be available via their networking social website that will trigger the user base services, block 38. The user will go out to the professional sports and entertainment social networking site, i.e., NFL Fan Zone, Coaches Zone, or Player Zone, and click on the web link requesting to sign up for multimedia and streaming services, block 40.

At this time the user pays the sports and entertainment social networking payment structure, block 42, and signs a disclaimer which relates to the hardware and system computing system requirements including the parsing of an isolated partition on the user's hard drive and the necessary free space require for operation, block 44. The user also identifies the type of his/her operating system, and creates a profile for a business client, block 46. Upon payment for the services and transmittal of the disclaimer, the automated process begins via a unique preconfigured virtual appliance containing the software images, block 48. The virtual appliance is a preconfigured software bundle container that contains the social media software application console and all the necessary software components to make the application ready to run, block 50. With live streaming the technology is in place to turn each user's hidden partition into a live T.V. or radio station via a virtual channel, block 52.

The virtual appliance will also partition a special and secret hard drive on the user's personal computer to isolate the application from the operating system. Additionally, this component will include the unique multimedia databases that will tag the multimedia images and provide for the proper direction upon transmittal to the social networking site. Also, unique profiles can be built separate from the social networking site or the profiles can be built as part of the existing website architecture. This will carry a dependency upon the most efficient way based upon the business clients' architecture, which will be carried out as part of the systems review. A unique profile is created by the client user that will be assigned a unique identifier that coincides with the business requestor such as Professional Sports Teams, Collegiate Sports Teams, High School Sport Teams, and Youth Sports Teams, and other Cross Business Domains, external to the sports and entertainment industry. The latter refers to those entertainment executives and entertainment users, such as for a live concert or for business executives and its employees.

In the method disclosed there are two levels of administration, the business client level and the business user at the local domain level. Since the isolated partition is hidden (hidden meaning a hard drive letter is not assigned making it invisible to all operating system types) making the multimedia and its social media structure completely safe and secure from hackers. Additionally, spyware and antivirus software can be part of the bundle if deemed necessary and/or if the user does not have one installed.

The system has the capabilities of steaming to the desktop computer regardless of the indicate Operating System. As a further note to this step, if the user needs more storage then what is available, then the virtual appliance console will recognize the new attached remote storage device and will parse that as a logical extension of the hidden drive. It is also noted that virtual services as a software type service normally requires a data center to hold all the machines necessary to provide the machines, which is an expensive endeavor.

Never the less a user's machine will in essence become a physical server that eventually will be converted to a unique virtual machine; that will store, create, and transfer the multimedia as software images and/or data to other social networking sites and/or other server entities. The tool will control where the images are sent and will have the ability to strip off and reassign new and unique user and system identifiers.

The user will create his/her own multimedia and will have the option of saving the image or live streaming to a designated server on the business client site for immediate viewing. If the user chooses to save the image, then he/she will have the necessary tools for repurposing and sizing it to a specified format. Also, the application will have the ability to interact with hardware devices locally, such as one's own computer webcam or an attached multimedia entertainment device, including those devices from a television set top box or from an entertainment systems, such as an x-box.

The application will recognize the type of device and assign the appropriate hardware plug-in devices for application interaction. It is noted that neither the virtual software application nor its underlying virtual machines will have the ability to modify other local resources, nor its associated registries. The application will only use the relevant hardware local devices or any attached hardware devices.

As part of the business technology process, the related software components will allow a user to convert his/her own physical multimedia images to the web via his/her wireless of LAN based network, removing the need for many multimedia physical servers. This is accomplished by taking a local partition on a physical machine, and then virtualizing it to one or many virtual machines that will allow the transport of images and other social media interaction to a web server of choice that has the capability of streaming back to the interface constantly and instantly for full round trip interactions. Incorporated into the technology are the unique business methods, functions and its associated unique software console and tools will allow a user to bring up a machine, install the right application to the right profile, tag and uniquely identify the source user, allow the unique local storage of large amounts of tagged data stored as software images in minutes and without the hassle of waiting, and without the need for large physical servers on the back end and front end through the use of both remote virtual machines, virtual clients, virtual application, an remote storage that has remote services for remote capability and virtual local and remote management capabilities.

The computing services, not the specific physical machines, enable live streaming capabilities through the passage of many types of communication channels and take advantage of the unused computing power and based unused hard drive storage at the local level for full virtual server enablement. Additionally, the virtual machines and their associated virtual appliance containers will allow for unique remote capabilities by encapsulating the correct business methods and processes allowing domain user triggered interactions for full round trip remote computer capabilities, all while taking full advantage of unused computing power.

The result is a cost effective enablement of full multimedia live steams and/or multimedia social content at the local domain personal computer level allowing business domain services to happen globally without the need for expensive architecture. Equally important is that data mining and business intelligence functions will happen automatically through the virtual appliance console. This virtual data mining will allow businesses to better understand its users and their associated social interactions. For instance, the user interactions and its associated data bases will have the ability to cache and create a new virtual appliance that can be used for high school, college, and professional sports recruiting. Right now large virtual service centers for service oriented architectures must be deployed and developed that costs businesses many thousands if not millions of dollars to implement today. As a conceptual notation, the software virtual appliance can eventually become a much value added tool for global data mining for local and federal governments and as a unique tool for better understanding the world and the global internet users place in the global economy. This type of data mining could very well create the pool of virtual services necessary for the continual evolution of virtual global data centers that has far reaching potentials beyond the sports and entertainment industries.

Figure 4:
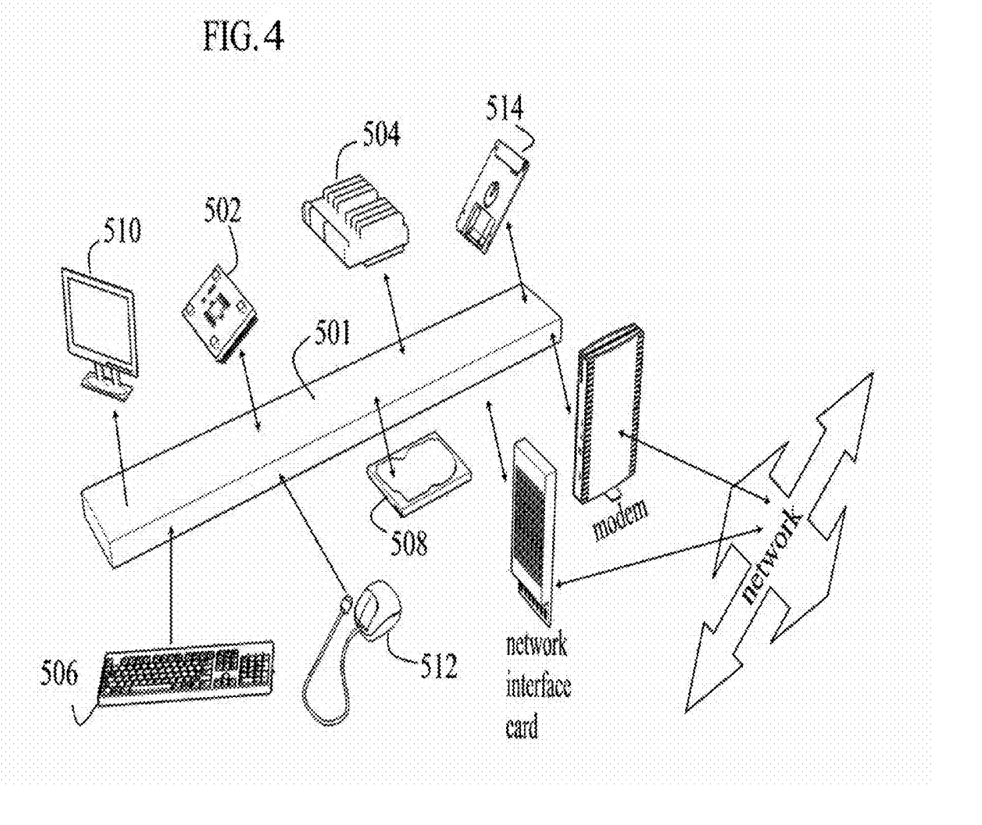
FIG. 4 is a block diagram of a computer system for use with the present invention.

The present invention can be used on any properly configured general purpose computer system, such as the system shown in FIG. 4. Such a computer system 500 includes a processing unit (CPU) 502 connected by a bus to a random access memory 504, a storage device 508, a keyboard 506, a display 510 and a mouse 512. In addition, there is a device 514 for entry of data and software, including software embodying the present invention, into the system. An example of such a computer can be a Dell personal computer operating on the Microsoft Windows operating system, or Linux, Macintosh, etc. The invention can also be used on a laptop computer or mobile device.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein.

The present invention may be embodied as a system, method, or computer program product. Accordingly, the present invention may take the form of a hardware embodiment, a software embodiment, or an embodiment combining software and hardware. Furthermore, the present invention may take the form of a computer program product embodied in any tangible medium of expression having computer-usable program code embodied in the medium.

Any combination of one or more computer usable or computer readable medium(s) may be utilized. Specific examples of the computer-readable medium can include: a hard disk, a random access memory (RAM), a read-only memory (ROM), an erasable programmable read-only memory (EPROM), or Flash memory, a portable compact disc read-only memory (CD-ROM), etc. In the context of this document, a computer-usable or computer-readable medium may be any medium that can be used by or in connection with the instruction execution system or apparatus. Computer program code for carrying out operations of the present invention may be written in any combination of one or more programming languages. The program code may execute entirely on the user's computer, partly on the user's computer, as a stand-alone software package, partly on the user's computer and partly on a remote computer or entirely on the remote computer or server.

The present invention is described above with reference to a computer program products according to an embodiment of the invention. It will be understood that each block, and combinations of blocks shown, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart or blocks.

These computer program instructions may also be stored in a computer-readable medium that can direct a computer or other programmable data processing apparatus to function in a particular manner, such that the instructions stored in the computer readable medium produce an article of manufacture including instructions means which implement the function specified in the blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions specified.

The flowchart in the figure illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the flowchart illustration, and combinations of blocks in the flowchart illustration, can be implemented by special purpose hardware-based systems that perform the specified functions or acts, or combinations of special purpose hardware and computer instructions.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method for delivering multimedia services comprises:
providing a virtual machine containing preconfigured software components unique for a networked electronic service system on a user's local physical machine;
generating a software image of the virtual machine and associating an identifier that uniquely identifies the networked electronic service system as specified by the user;
providing an isolated local physical partition on said user's local physical machine;
running said software image in the isolated local physical partition as if said local physical partition is part of said networked electronic service system; and
forming a communication channel with said networked electronic service system by said software image to allow live streaming media from said user local physical partition to the networked electronic service system that has the capability of streaming back to the user local physical partition constantly and instantly for full round trip interactions.

2. The method of claim 1 wherein said isolated local partition is hidden.

3. The method of claim 2 wherein said user's physical machine can be converted into a virtual machine.

4. The method of claim 3 wherein said user's physical machine, when converted into a virtual machine can store, create and transfer multimedia as data to other networking sites and other server entities.

5. The method of claim 3 wherein said user's physical machine when converted into a virtual machine can store, create and transfer multimedia as software images to other networking sites or other server entities.

6. The method of claim 5 wherein the other networking sites are for professional sports and entertainment network sites.

7. The method of claim 6 wherein an agreement is signed between said user and a software vendor of said method prior to the user having access to receive said professional sports and entertainment network site.

8. The method of claim 1 wherein said user promote itself to different entities using live media streaming as a multimedia hub.

9. The method of claim 8 wherein the multimedia hub acts as a main communication broker and expanded tool set that retrieves a previously stored image from an archive, converts the video image back to a video stream that can run a non-progressive stream in its own virtual space or as a service instance on the business client as well as a local instance on the client side.

10. A system for delivering multimedia services comprises:
a virtual machine containing preconfigured software components unique for a networked electronic service system on a user's local physical machine;
a software image of the virtual machine and an identifier that uniquely identifies the networked electronic service system as specified by the user; and
an isolated local physical partition on said user's local physical machine that is used to run said software image in the isolated local physical partition as if said local physical partition is part of said networked electronic service system and to form a communication channel with said networked electronic service system by said software image to allow live streaming media from said user local physical partition to the networked electronic service system that has the capability of streaming back to the user local physical partition constantly and instantly for full round trip interactions.

11. The system of claim 10 wherein said isolated local partition is hidden.

* * * * *

UNITED STATES PATENT AND TRADEMARK OFFICE
CERTIFICATE OF CORRECTION

| | | |
|---|---|---|
| PATENT NO. | : 8,706,836 B2 | Page 1 of 1 |
| APPLICATION NO. | : 12/636464 | |
| DATED | : April 22, 2014 | |
| INVENTOR(S) | : Shara Susannah Vincent | |

It is certified that error appears in the above-identified patent and that said Letters Patent is hereby corrected as shown below:

On the Title Page, item (75), the printed patent has the First Named Inventor's middle name misspelled. On the patent the middle name "Susznnah" appears. This is not correct. As printed on form PTOL-85 the middle name "Susannah" appears. The correct inventor name is "Shara Susannah Vincent".

Signed and Sealed this
Second Day of December, 2014

Michelle K. Lee
*Deputy Director of the United States Patent and Trademark Office*